United States Patent
Sugimura et al.

(10) Patent No.: US 10,339,437 B2
(45) Date of Patent: *Jul. 2, 2019

(54) RF TAG ANTENNA AND METHOD FOR MANUFACTURING SAME, AND RF TAG

(71) Applicant: PHOENIX SOLUTION CO., LTD., Kanazawa-shi, Ishikawa (JP)

(72) Inventors: Shiro Sugimura, Kanazawa (JP); Tatsuji Niwata, Kanazawa (JP)

(73) Assignee: PHOENIX SOLUTION CO., LTD., Kanazawa-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/107,793

(22) Filed: Aug. 21, 2018

(65) Prior Publication Data

US 2018/0357524 A1    Dec. 13, 2018

Related U.S. Application Data

(62) Division of application No. 15/550,344, filed as application No. PCT/JP2016/053610 on Feb. 8, 2016, now Pat. No. 10,089,573.

(30) Foreign Application Priority Data

Feb. 10, 2015    (JP) .................................. 2015-024280
Jun. 23, 2015    (JP) .................................. 2015-125350

(51) Int. Cl.
*H01Q 1/22*    (2006.01)
*H01Q 1/38*    (2006.01)
(Continued)

(52) U.S. Cl.
CPC ....... *G06K 19/07773* (2013.01); *G06K 19/07* (2013.01); *G06K 19/077* (2013.01);
(Continued)

(58) Field of Classification Search
None
See application file for complete search history.

(56) References Cited

FOREIGN PATENT DOCUMENTS

| JP | 2008-042379 A | 2/2008 |
|---|---|---|
| JP | 2008-191918 A | 8/2008 |

(Continued)

OTHER PUBLICATIONS

Japan Patent Office, Notice of Rejection dated Sep. 18, 2018 in Japanese Patent Application No. 2016-574787, 7 pages with English translation.

(Continued)

*Primary Examiner* — Kristy A Haupt
(74) *Attorney, Agent, or Firm* — Masuvalley & Partners

(57) ABSTRACT

[Problem to be Solved]
To provide an RF tag antenna capable of improving readability and a method of manufacturing the same, and an RF tag.
[Solution]
An RF tag antenna 10 according to an embodiment includes a first insulating substrate 40 having a first principal surface and a second principal surface, a first waveguide device 20 provided on the first principal surface, a second waveguide device 30 provided on the second principal surface, a power feeding part 50 electrically connected to the second waveguide device 30 at one end thereof, and a short-circuit part 60 electrically connected to the first waveguide device 20 at one end thereof and to the second waveguide device 30 at another end thereof, the first insulating substrate 40, the first waveguide device 20, the second waveguide device 30, the power feeding part 50 and the short-circuit part 60 form a plate-shaped inverted-F antenna that receives a radio wave transmitted from a reader, and an inductor pattern L formed by the first waveguide device 20, the short-circuit part 60,
(Continued)

the second waveguide device 30 and the power feeding part 50 and a capacitor 93 formed by the first waveguide device 20, the second waveguide device 30 and the first insulating substrate 40 form a resonant circuit that resonates in a frequency band of the radio wave.

8 Claims, 12 Drawing Sheets

(51) Int. Cl.
*H01Q 9/04* (2006.01)
*G06K 19/07* (2006.01)
*H01Q 13/08* (2006.01)
*G06K 19/077* (2006.01)

(52) U.S. Cl.
CPC ............ *H01Q 1/2225* (2013.01); *H01Q 1/38* (2013.01); *H01Q 9/0421* (2013.01); *H01Q 13/08* (2013.01)

(56) References Cited

FOREIGN PATENT DOCUMENTS

| JP | 4379470 B2 | 12/2009 |
| JP | 2012-253700 A | 12/2012 |
| JP | 2013-110685 A | 6/2013 |
| JP | 2014-086033 A | 5/2014 |

OTHER PUBLICATIONS

Japan Patent Office, Notice of Rejection dated Sep. 18, 2018 in Japanese Patent Application No. 2017-224426, 8 pages with English translation.

Japan Patent Office, Notice of Rejection dated Sep. 18, 2018 in Japanese Patent Application No. 2017-224424, 8 pages with English translation.

International Search Authority/JPO, International Search Report dated Apr. 26, 2016 in International Patent Application No. PCT/JP2016/053610 (with English translation), 2 pages.

RF TAG ANTENNA AND METHOD FOR MANUFACTURING SAME, AND RF TAG

RELATED APPLICATIONS

This application is a divisional application of copending U.S. patent application Ser. No. 15/550,344, filed on Aug. 10, 2017, entitled "RF TAG ANTENNA AND METHOD FOR MANUFACTURING SAME, AND RF TAG", which is the U.S. National Phase of and claims priority to International Patent Application No. PCT/JP2016/053610 filed on Feb. 8, 2016, which claims priority to Japanese Patent Application No. 2015-024280 filed on Feb. 10, 2015 and Japanese Patent Application No. 2015-125350 filed on Jun. 23, 2015; all of which are hereby expressly incorporated by reference in their entireties.

TECHNICAL FIELD

The present invention relates to an RF tag antenna and a method of manufacturing the same, and an RF tag.

BACKGROUND ART

In recent years, radio frequency identification (RFID) systems based on RFID have been under study in various fields such as physical distribution.

An RF tag used in the RFID system has an antenna and an IC chip. The RF tag receives a radio wave (carrier wave) transmitted from an antenna of a reader at the antenna thereof. The RF tag then transmits, on a reflection wave, identification data or the like on an object being conveyed recorded in the IC chip back to the reader. In this way, the RF tag can communicate with the reader without the need of touching the reader. The reader may have a writing function for writing information to the RF tag.

In Patent Literature 1, as an antenna for the RF tag, a patch antenna is described in which a plate-shaped radiating element and a conductive ground plate are arranged on the front surface and the back surface of a dielectric substrate, respectively. In Patent Literature 2, a thin patch antenna is described in which a magnetic sheet is disposed between an antenna part and a conductive ground plate, and the conductive ground plate is in contact with a metal member via a substrate.

CITATION LIST

Patent Literature

Patent Literature 1: Japanese Patent No. 4379470
Patent Literature 2: Japanese Patent Laid-Open No. 2013-110685

SUMMARY OF INVENTION

Technical Problem

An object of the present invention is to provide an RF tag antenna capable of improving readability and a method of manufacturing the same, and an RF tag.

Solution to Problem

An RF tag antenna according to the present invention comprises:

a first insulating substrate having a first principal surface and a second principal surface that is opposite to the first principal surface;
a first waveguide device provided on the first principal surface;
a second waveguide device provided on the second principal surface;
a power feeding part that is provided on a side surface of the first insulating substrate and electrically connected to the second waveguide device at one end thereof; and
a short-circuit part that is provided on the side surface of the first insulating substrate and electrically connected to the first waveguide device at one end thereof and to the second waveguide device at another end thereof,
the first insulating substrate, the first waveguide device, the second waveguide device, the power feeding part and the short-circuit part form a plate-shaped inverted-F antenna that receives a radio wave transmitted from a reader, and
an inductor pattern formed by the first waveguide device, the short-circuit part, the second waveguide device and the power feeding part and a capacitor formed by the first waveguide device, the second waveguide device and the first insulating substrate form a resonant circuit that resonates in a frequency band of the radio wave.

The RF tag antenna may further comprise an extension part that extends from a side edge of any one waveguide device of the first waveguide device and the second waveguide device and is stuck to the other waveguide device with a second insulating substrate interposed therebetween.

In the RF tag antenna, the extension part may be provided to run over a side surface that is opposite to the side surface.

In the RF tag antenna, the first waveguide device and the second waveguide device may have a same shape, and the sum of the lengths of side edges of each of the first waveguide device and the second waveguide device may be equal to any of $\lambda/4$, $\lambda/2$, $3\lambda/4$ and $5\lambda/8$ (where $\lambda$ denotes the wavelength of the radio wave).

In the RF tag antenna, the first insulating substrate may be made of a dielectric material.

In the RF tag antenna, the first insulating substrate may have a shape conforming to a shape of a surface of a target object at a position where an RF tag is attached to the target object.

In the RF tag antenna, the first waveguide device, the second waveguide device, the power feeding part and the short-circuit part may be formed on an insulating sheet having a flexibility.

An RF tag according to the present invention comprises:
the RF tag antenna described above; and
an IC chip that operates based on the radio wave,
wherein the resonant circuit has a resonance frequency that is set by considering an inductance of the inductor pattern, a capacitance of the capacitor and an equivalent capacitance in the IC chip.

In the RF tag, the first waveguide device and/or the second waveguide device may be in contact with a conductor, and the conductor and the first waveguide device and/or the second waveguide device may receive the radio wave.

In the RF tag, the first waveguide device and/or the second waveguide device may be in contact with a conductor via a third insulating substrate, and the conductor and the first waveguide device and/or the second waveguide device may receive the radio wave.

In the RF tag, the third insulating substrate may be a part of a case that houses the RF tag.

In the RF tag, a capacitance of a capacitor formed by the conductor, the third insulating substrate and the waveguide device(s) of the first waveguide device and the second waveguide device that is(are) in contact with the conductor via the third insulating substrate may be equal to or higher than the equivalent capacitance in the IC chip.

In the RF tag, a connecting conductor may be fitted in the case, and the second waveguide device and the conductor may be electrically connected to each other by the connecting conductor.

In the RF tag, the case may have a lid that is open at the top and houses the RF tag and a housing that houses the lid, the housing may have an outer peripheral part in which a hole is formed, and the case may be fixed to the conductor with fixing means through the hole.

In the RF tag, the RF tag may be housed in an insulating or conductive case.

In the RF tag, in a gap between the RF tag and a first inner surface of the case, a biasing member that pushes the RF tag toward a second inner surface opposite to the first inner surface may be provided.

In the RF tag, on a first inner surface of the case, a protrusion that pushes the RF tag toward a second inner surface opposite to the first inner surface may be provided.

In the RF tag, the case may be made of a conductive material, and an opening through which the radio wave passes may be formed in the case.

A method of manufacturing an RF tag antenna according to the present invention is a method of manufacturing the RF tag antenna described above, comprising:

a step of bending the power feeding part and the short-circuit part along a direction perpendicular to a longitudinal direction of the power feeding part and the short-circuit part at positions close to positions where the power feeding part and the short-circuit part are connected to the first waveguide device and the second waveguide device so that the first waveguide device and the second waveguide device are opposed to each other;

a step of sticking the first waveguide device to the first principal surface of the first insulating substrate; and a step of sticking the second waveguide device to the second principal surface of the first insulating substrate.

In the method of manufacturing the RF tag antenna, the first waveguide device, the second waveguide device, the power feeding part and the short-circuit part may be formed on an insulating sheet having a flexibility, and the power feeding part and the short-circuit part may be bent along with the sheet.

Advantageous Effects of Invention

According to the present invention, the first insulating substrate, the first waveguide device, the second waveguide device, the power feeding part and the short-circuit part form a plate-shaped inverted-F antenna that receives a radio wave transmitted from a reader. In addition, the inductor pattern formed by the first waveguide device, the short-circuit part, the second waveguide device and the power feeding part and the capacitor formed by the first waveguide device, the second waveguide device and the first insulating substrate form a resonant circuit that resonates in a frequency band of the radio wave transmitted from the reader. Thus, the plate-shaped inverted-F antenna can receive the radio wave transmitted from the reader with high sensitivity. In this way, the present invention can provide an RF tag antenna capable of improving readability and a method of manufacturing the same, and an improving readability RF tag.

DESCRIPTION OF EMBODIMENTS

First Embodiment

An RF tag antenna 10 and an RF tag 100 according to a first embodiment will be described with reference to the drawings.

Figure 1A:
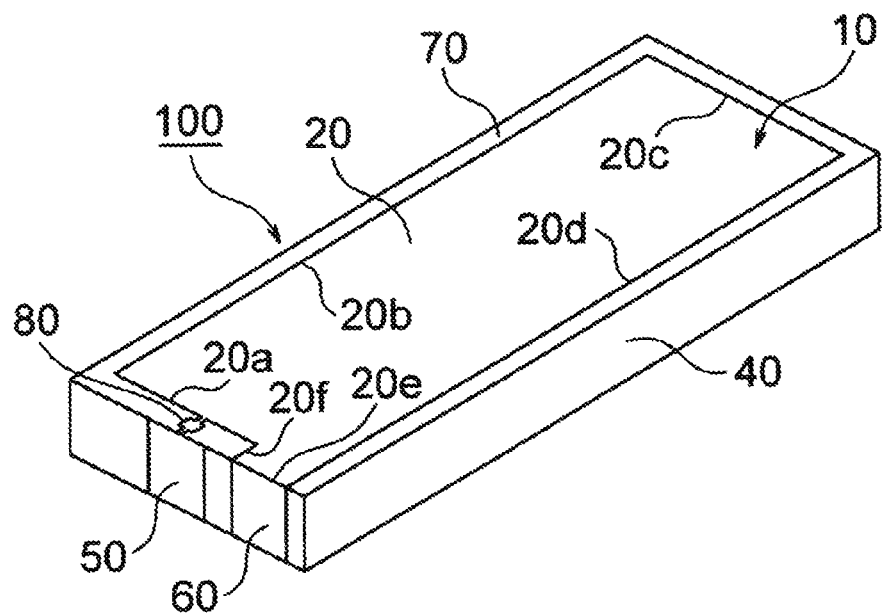
FIG. 1A is a perspective top view of an RF tag 100 according to a first embodiment.
Figure 1B:
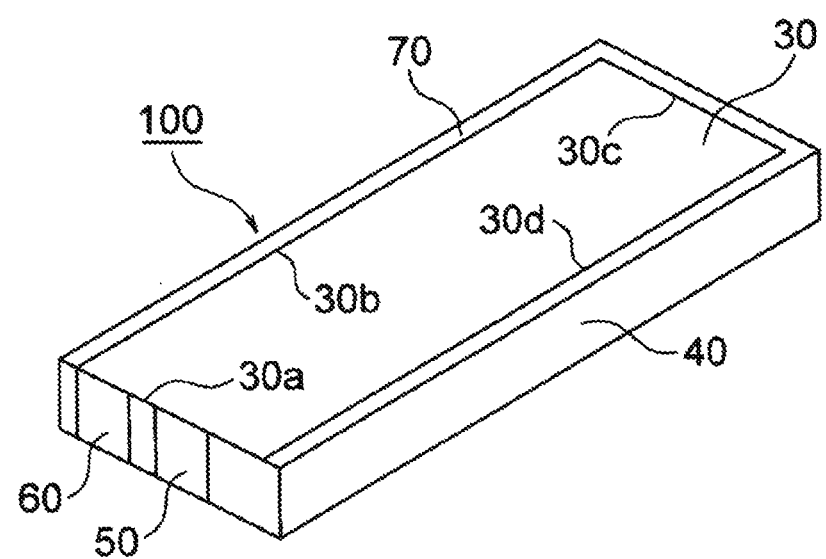
FIG. 1B is a perspective bottom view of the RF tag 100 according to the first embodiment.

As shown in FIGS. 1A and 1B, the RF tag antenna 10 includes a first waveguide device 20, a second waveguide device 30, a first insulating substrate 40, a power feeding part 50 and a short-circuit part 60.

The first insulating substrate 40 has an upper surface (first principal surface) and a lower surface (second principal surface) that is opposite to the first principal surface. The first insulating substrate 40 substantially has the shape of a rectangular parallelepiped, for example, although the shape of the first insulating substrate 40 is not limited to the shape. For example, the first insulating substrate 40 may have the shape of a disk or have an arc-shaped or otherwise curved cross section. Preferably, the first insulating substrate 40 has a shape conforming to the shape of the surface of a target object at a position where the RF tag 100 is attached to the target object. This eliminates limitations on where the RF tag can be attached, and the RF tag can have wider applications. For example, as shown in FIGS. 1E and 1F, when the RF tag 100 is attached to an outer surface of a cylindrical target object 150, the first insulating substrate 40 has a curved shape conforming to the shape of the outer surface of the cylindrical body.

The first waveguide device 20 is provided on the upper surface of the first insulating substrate 40. The second waveguide device 30 is provided on the lower surface of the first insulating substrate 40. Both the first waveguide device 20 and the second waveguide device 30 have a rectangular shape and are formed by etching, pattern printing or the like of a thin film of a metal, such as aluminum.

The first waveguide device 20 and the second waveguide device 30 have the same shape. Note that the expression "the same shape" in this application does not exclusively mean strictly the same shape but also means a shape that is slightly different due to the structure of the antenna. For example, when an IC chip 80 described later is to be provided on the same plane as the first waveguide device 20, the first waveguide device 20 having a rectangular shape needs to be partially recessed to accommodate the IC chip 80, as shown in FIG. 1A. In that case, the first waveguide device 20 and the second waveguide device 30 do not have strictly the same shape. However, the first waveguide device 20 and the second waveguide device 30 have similar rectangular shapes and thus are regarded as having the same shape.

The power feeding part 50 is provided on a side surface of the first insulating substrate 40 and is electrically connected to the second waveguide device 30 at one end thereof. The short-circuit part 60 is provided on the side surface of the first insulating substrate 40 and is electrically connected to the first waveguide device 20 at one end thereof and to the second waveguide device 30 at another end thereof. As shown in FIG. 1A, the power feeding part 50 and the short-circuit part 60 are members that are provided in parallel with each other on a sheet 70 so as to extend between the first waveguide device 20 and the second waveguide device 30.

The power feeding part 50 and the short-circuit part 60 may not be provided in parallel with each other. The power feeding part 50 and the short-circuit part 60 may be integrally formed at the same time as the first waveguide device 20 and the second waveguide device 30. Alternatively, the power feeding part 50 and the short-circuit part 60 may be formed separately from the first waveguide device 20 and the second waveguide device 30 and then be connected to the first waveguide device 20 and the second waveguide device 30 at the relevant ends.

Figure 1C:
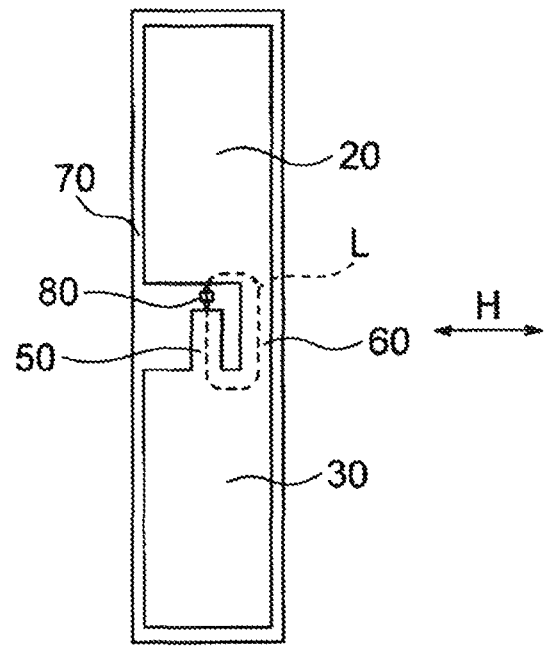
FIG. 1C is a developed view of a sheet 70 of the RF tag 100 according to the first embodiment.

As shown in FIGS. 1A, 1B and 1C, the first waveguide device 20, the second waveguide device 30, the power feeding part 50 and the short-circuit part 60 are formed on the sheet 70, which is insulating, and are stuck to the first insulating substrate 40 with the sheet 70 bent along side edges of the first insulating substrate 40 interposed therebetween. As described in more detail later, the RF tag antenna 10 can be readily manufactured by bending the sheet 70, which is flexible, on one surface of which the first waveguide device 20, the second waveguide device 30, the power feeding part 50 and the short-circuit part 60 are formed along with the power feeding part 50 and the short-circuit part 60 and sticking the sheet 70 to the first insulating substrate 40.

As the material of the sheet 70, an insulating material having flexibility, such as PET, polyimide or vinyl, can be used. Although the thickness of the sheet 70 is not particularly limited, the thickness is generally of the order of several tens μm. An insulating coating may be applied to the surface of the waveguide devices 20 and 30.

Although the first waveguide device 20 and the second waveguide device 30 are formed on the sheet 70 (substrate) in this embodiment, the first waveguide device 20 and the second waveguide device 30 do not always have to be formed on the sheet 70. For example, the first waveguide device 20 and the second waveguide device 30 may be formed as a separate component. Alternatively, after the first waveguide device 20 and the second waveguide device 30 are formed on the sheet 70, the sheet 70 may be peeled off.

The first insulating substrate 40, the first waveguide device 20, the second waveguide device 30, the power feeding part 50 and the short-circuit part 60 form a plate-shaped inverted-F antenna. The plate-shaped inverted-F antenna receives a radio wave transmitted from a reader (not shown). If the first waveguide device 20 absorbs the radio wave, the second waveguide device 30 serves as a conductive ground plate. On the other hand, if the second waveguide device 30 absorbs the radio wave, the first waveguide device 20 serves as a conductive ground plate. That is, depending on the way of use of the RF tag 100, the waveguide devices 20 and 30 can function as a waveguide device or a conductive ground plate.

The first waveguide device 20 is designed so that a sum A of the lengths of side edges $20a$ to $20f$ thereof is equal to $\lambda/4$, $\lambda/2$, $3\lambda/4$ or $5\lambda/8$. $\lambda$ denotes the wavelength of the radio wave transmitted from the reader. The wavelength $\lambda$ of the radio wave is not particularly limited, as far as the wavelength falls within a range of wavelengths that can be used for the RF tag. The second waveguide device 30 is designed so that a sum B of the lengths of side edges $30a$ to $30d$ thereof is approximately equal to the sum A.

As described above, the first waveguide device 20 and the second waveguide device 390 have the same shape, and the sum A of the lengths of the side edges of the waveguide device 20 and the sum B of the lengths of the side edges of the waveguide device 30 are approximately equal to $\lambda/4$, $\lambda/2$, $3\lambda/4$ or $5\lambda/8$. Thus, the resonance frequency of the plate-shaped inverted-F antenna can be readily set. In addition, the RF tag 100 can independently operate without being affected by where the RF tag 100 is installed (for example, without the waveguide devices 20 and 30 being in contact with a conductor).

As far as the sums A and B of the lengths of the side edges of the waveguide devices 20 and 30 are equal to any of the values described above, the planar shape of the waveguide devices 20 and 30 is not limited to the rectangular shape. For example, the waveguide devices 20 and 30 may have a hollow square shape with a central part cut.

As the first insulating substrate 40, an insulator may be used. In that case, a certain opening area can be ensured, and the sensitivity of the plate-shaped inverted-F antenna can be improved. For example, as the first insulating substrate 40, foamed styrol may be used.

Alternatively, the first insulating substrate 40 may be made of a dielectric material. For example, as the first insulating substrate 40, a dielectric material having a relative dielectric constant of 1 to 20 inclusive is used. If a dielectric material (such as ceramic) having high dielectric constant is used, a capacitor 93 has a high capacitance, so that the opening area of the first waveguide device 20 and the second waveguide device 30 is small, and the RF tag 100 can be reduced in size. However, the RF tag antenna 10 has low gain, so that the range in which the RF tag 100 can communicate with the reader (communication range) is short. If a relatively long communication range, such as several meters or more, is required, a dielectric material having low dielectric constant is used for the first insulating substrate 40. In that case, the relative dielectric constant is preferably equal to or less than 5.

In the RF tag antenna 10, a resonant circuit that resonates in a frequency band of the radio wave transmitted from the reader and received by the plate-shaped inverted-F antenna is formed. The resonant circuit is formed by an inductor pattern L and the capacitor (first capacitor) 93 (see FIG. 2). The inductor pattern L is formed by the first waveguide device 20, the short-circuit part 60, the second waveguide device 30 and the power feeding part 50, and the capacitor 93 is formed by the first waveguide device 20, the second waveguide device 30 and the first insulating substrate 40. The resonant circuit allows the plate-shaped inverted-F antenna to receive the radio wave transmitted from the reader with high sensitivity and thus can improve the readability of the RF tag. In addition, the resonant circuit can raise a power supply voltage generated by the IC chip 80 described later.

The RF tag antenna 10 according to this embodiment can be used as an antenna of the reader.

A method of manufacturing the RF tag antenna 10 will be now described. First, as shown in FIGS. 1B and 1C, the power feeding part 50 and the short-circuit part 60 are bent along a direction H perpendicular to the longitudinal direction of the power feeding part 50 and the short-circuit part 60 at positions close to the positions where the power feeding part 50 and the short-circuit part 60 are connected to the first waveguide device 20 and the second waveguide device 30 so that the first waveguide device 20 and the second waveguide device 30 are opposed to each other. The first waveguide device 20 is then stuck to the upper surface of the first insulating substrate 40 with an adhesive or the like, and the second waveguide device 30 is stuck to the lower surface of the first insulating substrate 40. In this way, the plate-shaped inverted-F antenna serving as the RF tag antenna 10 can be manufactured.

As described above, the RF tag antenna 10 functioning as the plate-shaped inverted-F antenna is fabricated by bending the power feeding part 50 and the short-circuit part 60 and sticking the first waveguide device 20 and the second waveguide device 30 to the front surface and the back surface of the first insulating substrate 40, respectively. Thus, compared with a conventional patch antenna in which a coaxial line or a strip line for power feeding is provided, the RF tag antenna has a simplified structure and can be manufactured at lower cost.

Next, the RF tag 100 will be described. The RF tag 100 includes the RF tag antenna 10 described above and the IC chip 80 connected to the power feeding part 50.

As shown in FIG. 1A, the IC chip 80 is provided between the first waveguide device 20 and the power feeding part 50. The IC chip 80 is arranged on the side of the upper surface of the first insulating substrate 40 (on the same plane as the first waveguide device 20). As far as the function as the plate-shaped inverted-F antenna is provided, the IC chip 80 may be arranged on the side surface of the first insulating substrate 40. Furthermore, an external power supply may be connected to the IC chip 80 so that the IC chip 80 operates on a voltage supplied from the external power supply.

The IC chip 80 operates based on the radio wave received by the RF tag antenna 10 serving as the plate-shaped inverted-F antenna. More specifically, the IC chip 80 rectifies part of a carrier wave transmitted from the reader to generate a power supply voltage required for operation. The IC chip 80 makes a controlling logic circuit in the IC chip 80 and a non-volatile memory storing commodity-specific information or the like operate on the generated power supply voltage. In addition, the IC chip 80 makes a communication circuit or the like for transmitting or receiving data to or from the reader operate.

The IC chip 80 may contain a capacitor therein and has a stray capacitance. Thus, the resonance frequency of the resonant circuit is preferably set by considering an equivalent capacitance in the IC chip 80. In other words, the resonant circuit preferably has a resonance frequency set by considering the inductance of the inductor pattern L, the capacitance of the capacitor 93 and the equivalent capacitance in the IC chip 80.

Figure 2:
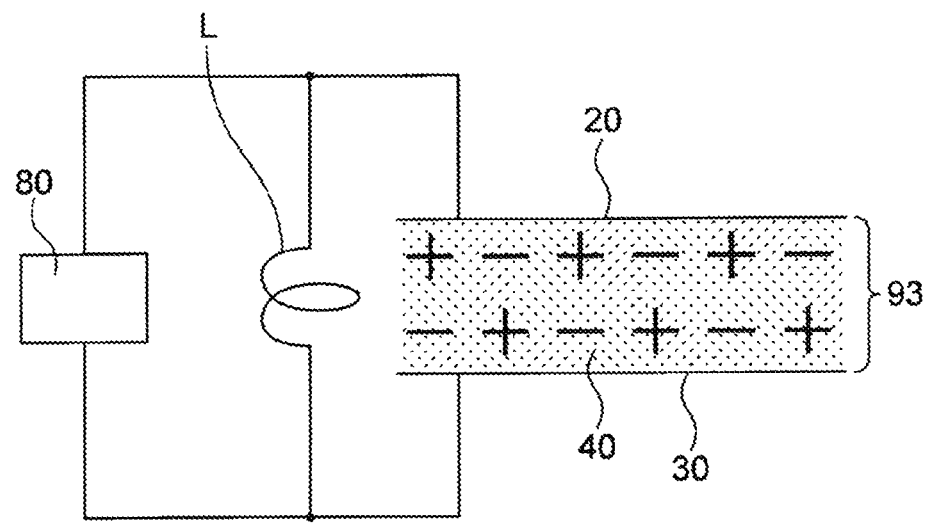
FIG. 2 is an equivalent circuit diagram of the RF tag 100 according to the first embodiment.

In an equivalent circuit of the RF tag 100, as shown in FIG. 2, the inductor pattern L, the capacitor 93 and the IC chip 80 are connected in parallel with each other. The inductor pattern L, the capacitor 93 and the IC chip 80 form the resonant circuit that resonates in the frequency band of the radio wave transmitted from the reader. A resonance frequency f[Hz] of the resonant circuit is given by the formula (1). The value of the resonance frequency f is set to fall within the frequency band of the radio wave transmitted from the reader.

[Formula 1]

$$f = \frac{1}{2\pi\sqrt{L_a \cdot (C_a + C_b)}} \quad (1)$$

In the formula, $L_a$ denotes the inductance of the inductor pattern L, $C_a$ denotes the capacitance of the capacitor 93, and $C_b$ denotes the equivalent capacitance in the IC chip 80. $C_b$ may be the value of the capacitance prescribed in the specification information of the IC chip used, for example.

As described above, the resonance frequency of the resonant circuit can be precisely set in the frequency band of the radio wave by considering the equivalent capacitance in the IC chip 80. As a result, the readability of the RF tag 100 can be further improved. In addition, the power supply voltage generated by the IC chip 80 can be further raised.

Figure 1D:
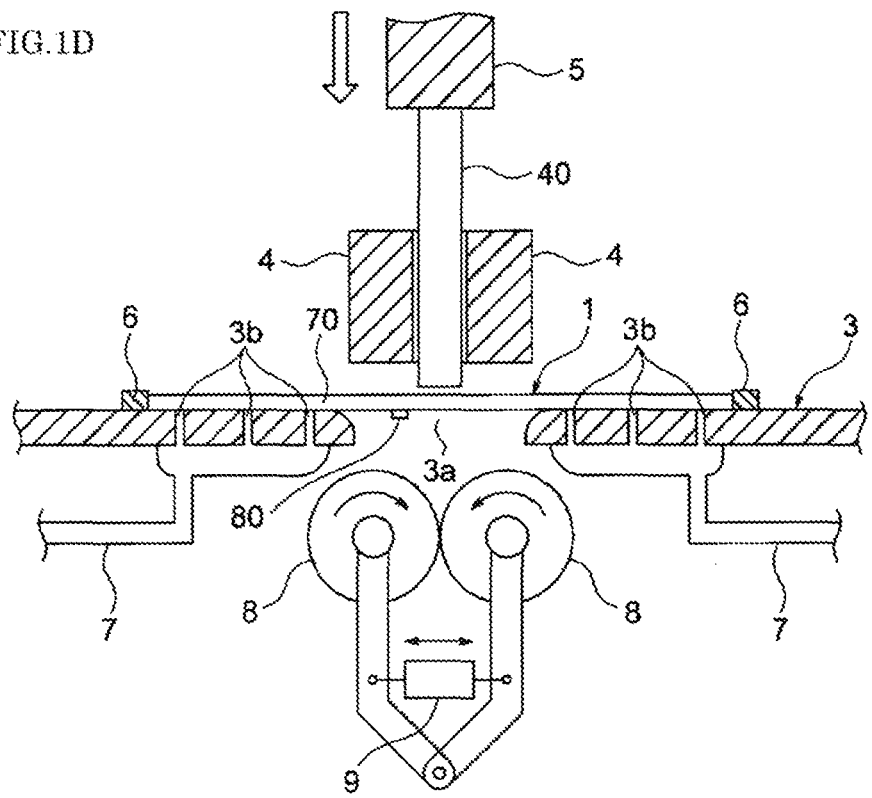
FIG. 1D is a diagram for illustrating a method of manufacturing the RF tag 100 according to the first embodiment.
Figure 1E:
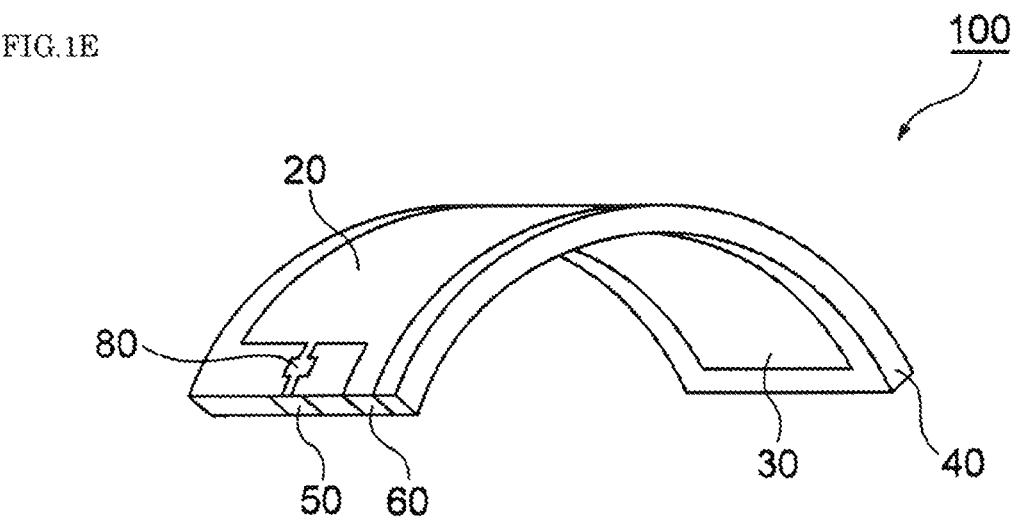
FIG. 1E is a perspective view of the RF tag 100 having a shape conforming to the shape of a surface of a target object 150.
Figure 1F:
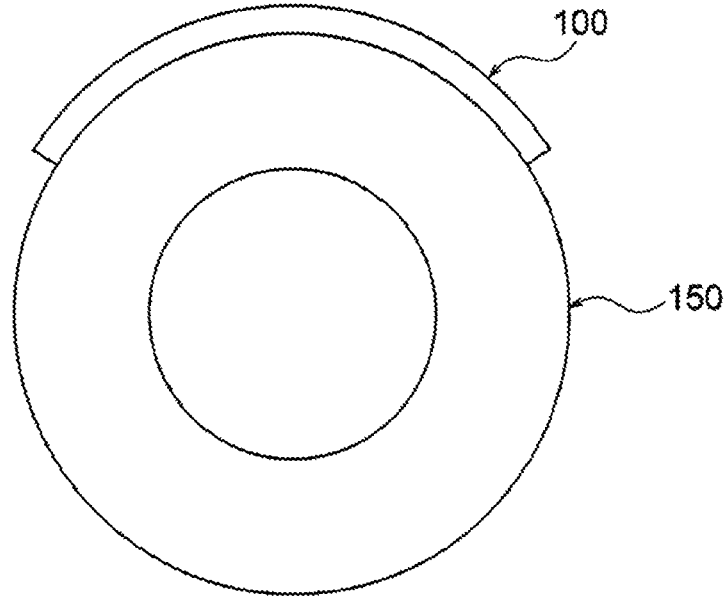
FIG. 1F is a side view of the RF tag 100 in FIG. 1E attached to the target object 150.

Next, with reference to FIG. 1D, a method of manufacturing the RF tag 100 will be described in detail. FIG. 1D shows an RF tag manufacturing apparatus, and a substrate 1 and the first insulating substrate 40 placed in the manufacturing apparatus. The substrate 1 has the sheet 70 to the upper surface of which an adhesive (not shown) is applied, a conductive section (not shown) formed on the lower surface of the sheet 70, and the IC chip 80 (described later) mounted on the lower surface of the sheet 70. The conductive section includes the first waveguide device 20, the second waveguide device 30, the power feeding part 50 and the short-circuit part 60. The conductive section may be the first waveguide device 20, the second waveguide device 30, the power feeding part 50 and the short-circuit part 60 integrally formed by etching, pattern printing or the like of a metal thin film.

As shown in FIG. 1D, the RF tag manufacturing apparatus includes a mount 3, a guide part 4, a pushing member 5, a positioning member 6, an air pipe 7, a pair of rubber rollers 8, and a biasing member 9. The mount 3 is a platform on which the substrate 1 is mounted. A passage hole 3*a* through which the first insulating substrate 40 passes through is formed in a central part of the mount 3. In addition, a suction air hole 3*b* that penetrates the mount 3 in the thickness direction is also formed in the mount 3.

The guide part 4 makes the first insulating substrate 40 slide in the vertical direction until the first insulating substrate 40 abuts against a predetermined portion of the substrate 1 at an end thereof. The predetermined part is a portion of the substrate 1 where the power feeding part 50 and the short-circuit part 60 are provided.

The pushing member 5 is a member for pushing the first insulating substrate 40 inserted in the guide part 4 downwardly in the vertical direction. The positioning member 6 is arranged on the mount 3. The positioning member 6 positions the substrate 1 at a predetermined position on the mount 3. The air pipe 7 is in communication with the suction air hole 3*b* at one end thereof and is connected to a suction pump (not shown) at another end.

The pair of rubber rollers 8 pinch the first insulating substrate 40 squeezed downwardly therebetween by the pushing member 5 and the substrate 1 entangled with the first insulating substrate 40. The rubber rollers 8 are made of an elastic material to prevent the IC chip 8 from being damaged. As shown in FIG. 1D, the biasing member 9 is connected to one of the rubber rollers 8 at one end thereof and to the other rubber roller 8 at another end thereof. The biasing member 9 allows the pair of rubber rollers 8 to pinch the first insulating substrate 40 squeezed therebetween by the pushing member 5.

A method in which the manufacturing apparatus described above manufactures the RF tag is as follows. First, the substrate 1 is positioned by the positioning member 6 and mounted on the mount 3. The suction pump is then activated to sucks the substrate 1 through the suction air hole 3*b* to fix the substrate 1 on the mount 3. The first insulating substrate 40 is then mounted on the guide part 4. The pushing member 5 is then driven to push vertically downwardly the first insulating substrate 40 mounted on the guide part 4. Once the first insulating substrate 40 comes into contact with the substrate 1, the suction force of the suction pump is reduced to allow the substrate 1 to move. After that, the first insulating substrate 40 is further pushed vertically downwardly until the substrate 1 and the first insulating substrate 40 reach the pair of rubber rollers 8 and are pinched between the pair of rubber rollers 8. After that, the rubber rollers 8 rotate, and the substrate 1 and the first insulating substrate 40 pinched between the pair of rubber rollers 8 are conveyed downwardly. During the conveyance, the substrate 1 is bonded to the first insulating substrate 40 under the pinching force of the pair of rubber rollers 8 biased by the biasing member 9.

<RF Tag 100 Placed on Conductor 200>

Figure 3:
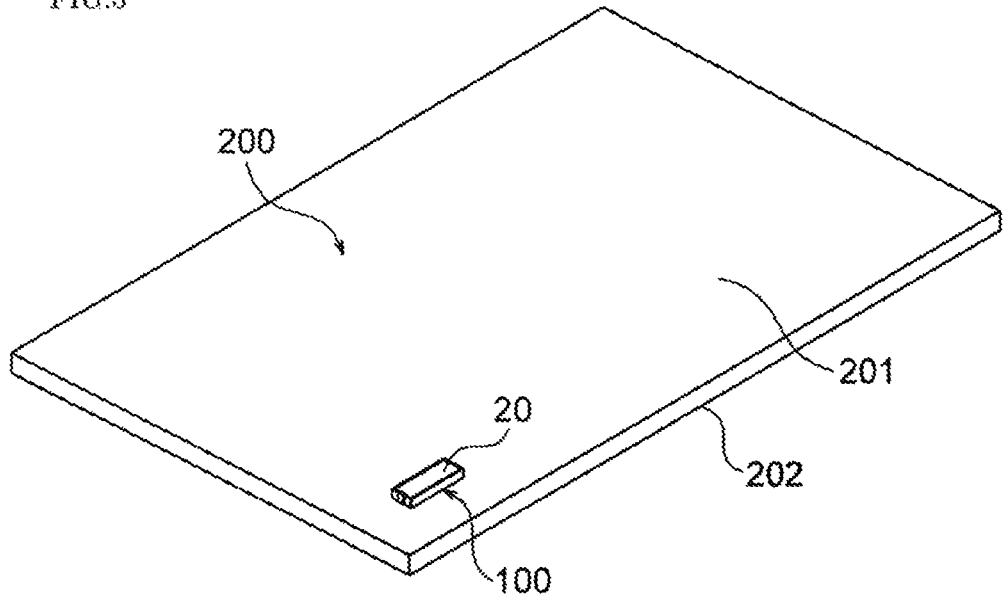
FIG. 3 is a perspective view of the RF tag 100 according to the first embodiment placed on a conductor 200.

With reference to FIG. 3, the RF tag 100 placed on the conductor 200 will be described. FIG. 3 is a perspective view of the RF tag 100 placed on an upper surface of the conductor 200.

The RF tag 100 is placed in such a manner that the second waveguide device 30 is in contact with the conductor 200. The expression "the waveguide device is in contact with the conductor" in this application means not only a case where the waveguide device is in direct contact with the conductor but also a case where there is some substance between the waveguide device and the conductor as far as the waveguide device can be regarded as being electrically connected to the conductor.

In this embodiment, the conductor 200 is a metal plate. The term "conductor" in this application is used as a "generic name of a substance that has a relatively high electrical conductivity" as generally defined in dictionaries, and metals are a typical example of the conductor. However, the "conductor" is not limited to metals but may be the human body, plants, water or the ground, for example.

The second waveguide device 30 is in contact with, and electrically connected to, the conductor 200, and the conductor 200 and the second waveguide device 30 receive the radio wave. Alternatively, the first waveguide device 20 may be in contact with the conductor 200, or both the first waveguide device 20 and the second waveguide device 30 may be in contact with the conductor 200. The conductor 200 and the first waveguide device 20 and/or the second waveguide device 30 receives the radio wave.

As described above, the first waveguide device 20 and/or the second waveguide device 30 is in contact with the conductor 200 and thereby electrically connected to the conductor 200. Since the RF tag antenna 10 is a plate-shaped inverted-F antenna, the waveguide device(s) and the conductor 200 can serve as one waveguide device having a large opening area to absorb (receive) the radio wave from the reader. Thus, the sensitivity of the plate-shaped inverted-F antenna can be improved.

When the RF tag 100 is placed on the conductor 200 as described above, the conductor 200 itself also function as a waveguide device. Therefore, the RF tag 100 can be activated not only when the surface on which the RF tag 100 is placed is irradiated with the radio wave but also when the surface on which the RF tag 100 is not placed (the surface on which no RF tag is seen) is irradiated with the radio wave. Thus, the RF tag 100 can be stuck to the conductor 200 at a position where the RF tag 100 is hidden and cannot be seen.

Furthermore, when the first waveguide device 20 and/or the second waveguide device 30 is in contact with the conductor 200, the conductor 200 and the waveguide device(s) 20 and/or 30 function as one large waveguide device, so that the size of the waveguide devices 20 and 30 and the size of the conductor 200 are not particularly limited.

As described above, with the RF tag 100, the conductor 200 itself functions as a waveguide device. Thus, the RF tag 100 is activated not only when a placement surface (upper surface) 201 on which the RF tag 100 is placed is irradiated with the radio wave from the reader but also a non-placement surface (lower surface) 202 on which the RF tag 100 is not placed is irradiated with the radio wave.

The conductor 200 may not be placed on the side of the second waveguide device 30 as shown in FIG. 3 but may be placed on the side of the first waveguide device 20. That is, the RF tag 100 may be placed in such a manner that the first waveguide device 20 is in contact with the conductor 200. Alternatively, both the first waveguide device 20 and the second waveguide device 30 may be in contact with the conductor. For example, the RF tag 100 may be sandwiched between two metal plates. However, when the first waveguide device 20 is in contact with the conductor 200, there is a possibility that the IC chip 80 and the conductor 200 are electrically connected to each other and short-circuited. To prevent such a short circuit, a measure needs to be taken, such as preventing the surface of the IC chip 80 from being covered with the conductor 200 (keeping the IC chip 80 exposed, for example) or providing the IC chip 80 on the side surface of the first insulating substrate 40.

The same holds true for a case where the RF tag 100 is placed on a non-conductive material (insulator), such as rubber. That is, the RF tag 100 is activated even when the surface on which the RF tag 100 is not placed is irradiated with the radio wave. In that case, the RF tag 100 is activated by receiving the radio wave transmitted through the insulator.

<Way of Arrangement of RF Tags 100>

Figure 13:
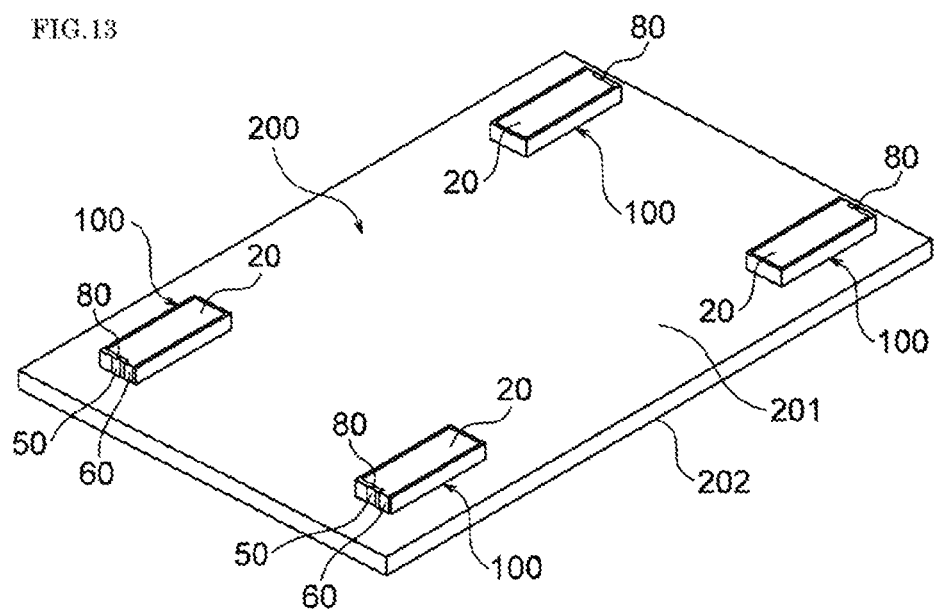
FIG. 13 is a perspective view showing a preferred arrangement of a plurality of RF tags 100 on the conductor 200.

A case where a plurality of RF tags are arranged on the conductor 200 having a rectangular shape will be described. In this case, as shown in FIG. 13, a plurality of RF tags 100 are preferably placed in such a manner that the power feeding part 50 of each RF tag 100 faces an end (side edge) of the conductor 200. By placing the plurality of RF tags 100 along the direction of the current flow, the operational efficiency of the RF tags 100 is improved, and the radio wave can be efficiently radiated.

Second Embodiment

Next, an RF tag antenna 11 and an RF tag 100A according to a second embodiment will be described. Note that the same components as those in the first embodiment are denoted by the same reference numerals, and descriptions thereof will be omitted.

In this embodiment, the RF tag antenna 11 includes an extension part 90 that extends from a side edge of the second waveguide device 30. The extension part 90 extends from a side edge of one of the first waveguide device 20 and the second waveguide device 30 and is stuck to the other of the waveguide devices with a second insulating substrate 91 interposed therebetween.

Figure 4A:
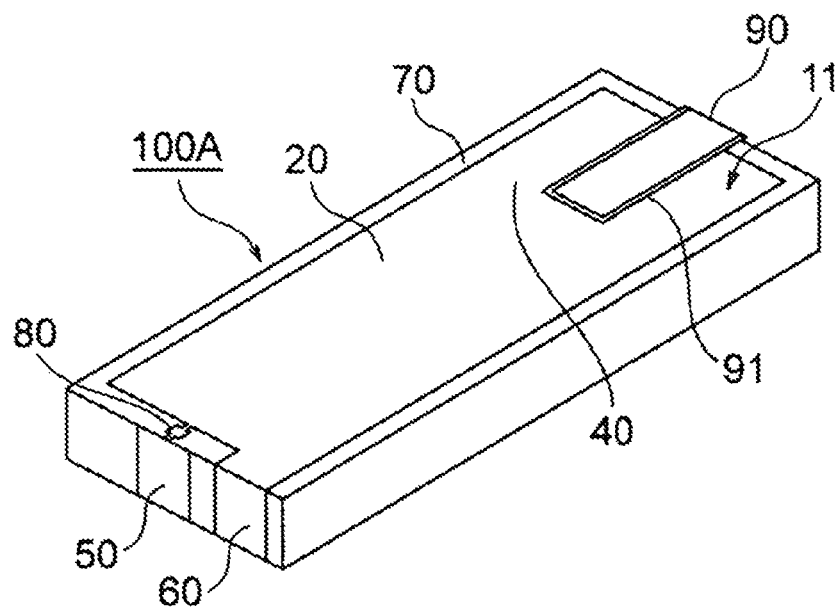
FIG. 4A is a perspective top view of an RF tag 100A according to a second embodiment.
Figure 4B:
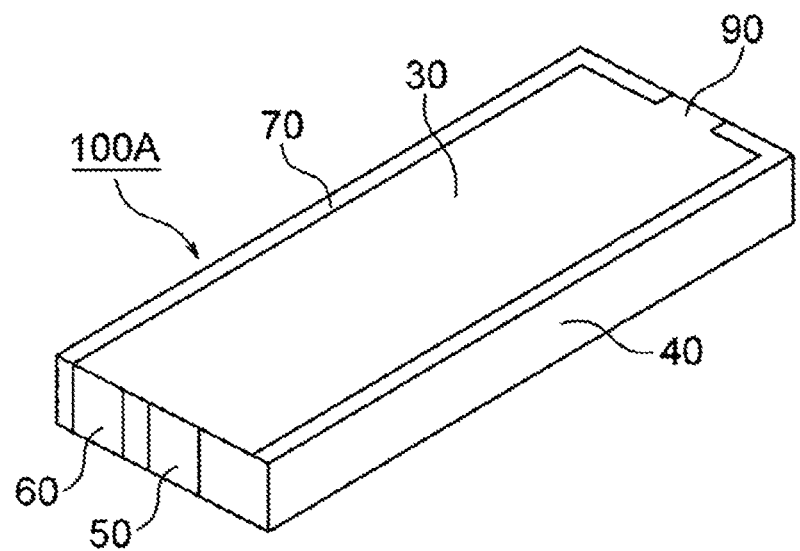
FIG. 4B is a perspective bottom view of the RF tag 100A according to the second embodiment.
Figure 4C:
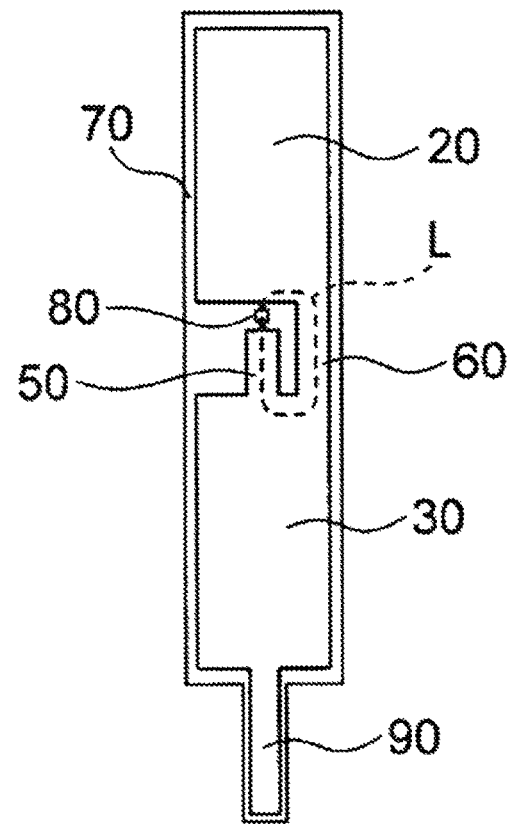
FIG. 4C is a developed view of the sheet 70 of the RF tag 100A according to the second embodiment.

In this embodiment, as shown in FIGS. 4A, 4B, 4C and 5, the extension part 90 extends from a side edge of the second waveguide device 30 and is stuck with an adhesive or the like to the surface of the first waveguide device 20 with the second insulating substrate 91 interposed therebetween. As shown in FIG. 4A, the extension part 90 is provided to run over the side surface of the first insulating substrate 40 that is opposite to the side surface on which the power feeding part 50 and the short-circuit part 60 are provided.

Figure 5:
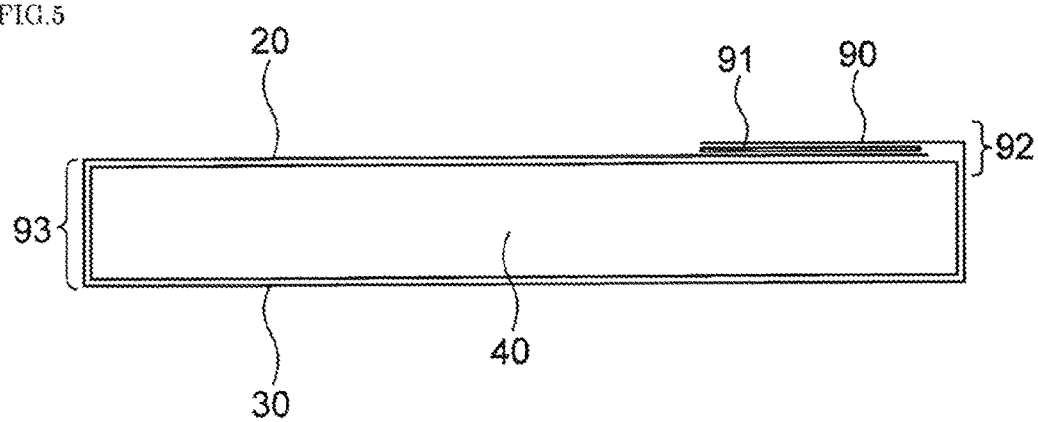
FIG. 5 is a vertical cross-sectional view of the RF tag 100A according to the second embodiment.

By sticking the extension part 90 to the surface of the first waveguide device 20 with the second insulating substrate 91 as described above, a capacitor 92 having a low capacitance is formed by the extension part 90, the second insulating substrate 91 and the first waveguide device 20 as shown in FIG. 5.

The capacitor 92 and the capacitor 93 formed by the first waveguide device 20, the second waveguide device 30 and the first insulating substrate 40 provide a capacitive coupling effect. Thus, the capacitance of the capacitor 93 can be adjusted to adjust the combined capacitance of the capacitors 92 and 93 and readily adjust the resonance frequency of the RF tag antenna 11. The capacitance of the capacitor 93 can be adjusted by changing the shape or area of the extension part 90 or the dielectric constant or thickness of the second insulating substrate 91, for example.

The second insulating substrate 91 may be formed separately. For example, a separately formed insulating film may be inserted between the extension part 90 and the first waveguide device 20.

When the surface of each of the waveguide devices 20 and 30 is subjected to an insulating coating process, the insulating coating may be used as the second insulating substrate 91.

The RF tag antenna 11 according to this embodiment can be used as an antenna of the reader.

Third Embodiment

Next, an RF tag antenna and an RF tag according to a third embodiment will be described. Note that the same components as those in the first and second embodiments are denoted by the same reference numerals, and descriptions thereof will be omitted.

In this embodiment, the second waveguide device 30 is in contact with the conductor 200 with a third insulating substrate 300 interposed therebetween. In addition, the capacitance of a capacitor part 301 (second capacitor) formed by the second waveguide device 30, the conductor 200 and the third insulating substrate 300 is set to be equal to or higher than an equivalent capacitance in the IC chip 80.

Figure 6:
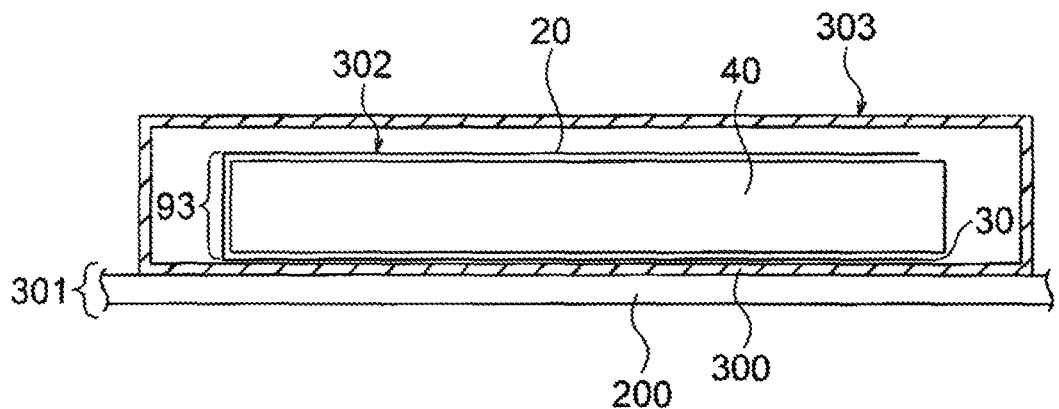
FIG. 6 is a vertical cross-sectional view of an RF tag 302 according to a third embodiment.

In this embodiment, the third insulating substrate 300 is a part of a case 303. As shown in FIG. 6, an RF tag 302 is housed in the case 303, which is made of plastics or the like and non-conductive, and the case 303 housing the RF tag 302 is placed on the conductor 200. Since the RF tag 302 is housed in in the case 303, waterproofness and dustproofness can be improved. The material of the case 303 may be ABS resin or fiber reinforced plastics (FRP), although the material is not limited to thereto.

Figure 7:
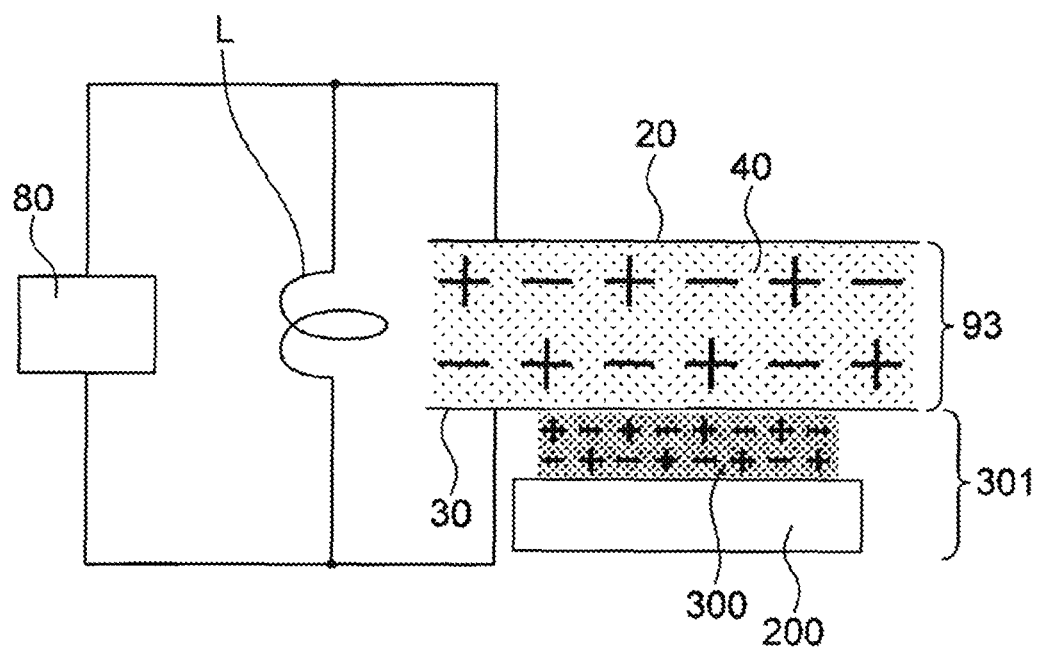
FIG. 7 is an equivalent circuit diagram of a system including the RF tag 302, a case 303 and the conductor 200 according to the third embodiment.

FIG. 7 is an equivalent circuit diagram of a system including the RF tag 302, the case 303 and the conductor 200. As shown in FIG. 7, the capacitor 301 is connected in series with the capacitor 93 (first capacitor) formed by the first waveguide device 20, the second waveguide device 30 and the first insulating substrate 40. Therefore, the combined capacitance of the capacitors 93 and 301 can vary, and the resonance frequency of the resonant circuit of the RF tag can vary significantly.

More specifically, when the capacitance of the capacitor 301 is substantially smaller than the capacitance of the capacitor 93, the combined capacitance decreases more remarkably than the capacitance of the capacitor 93. This means that, when the RF tag housed in the non-conductive case is placed on the conductor, the resonance frequency of the resonant circuit of the RF tag varies significantly, and the readability of the RF tag deteriorates.

To avoid this, in this embodiment, the capacitance of the capacitor 301 is set to be equal to or higher than the equivalent capacitance in the IC chip 80. In this way, the combined capacitance of the capacitors 93 and 301 can be prevented from substantially decreasing, and performance degradation of the RF tag 302 can be reduced. The capacitance of the capacitor 301 is preferably set to be two times or more higher than the equivalent capacitance in the IC chip 80.

As in the first embodiment, the conductor may be placed not only on the side of the second waveguide device 30 but also on the side of the first waveguide device 20. Alternatively, the conductor may be provided on both the first waveguide device 20 and the second waveguide device 30.

Figure 8A:
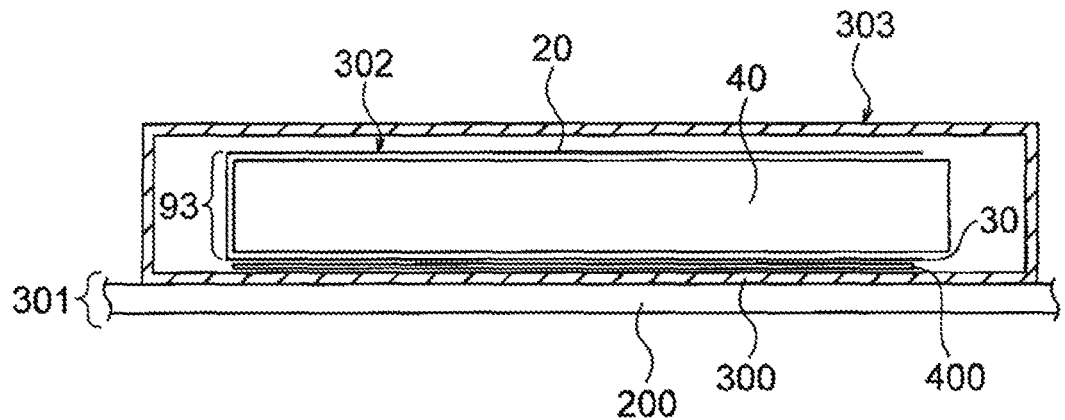
FIG. 8A is a vertical cross-sectional view of an RF tag according to a first modification of the third embodiment.

As shown in FIG. 8A, an adhesive layer 400 formed by an adhesive cured may be provided between the second waveguide device 30 and the third insulating substrate 300 (case 303) so that the adhesive layer 400 firmly fixes the second waveguide device 30 and the third insulating substrate 300 (case 303) to each other.

Figure 8B:
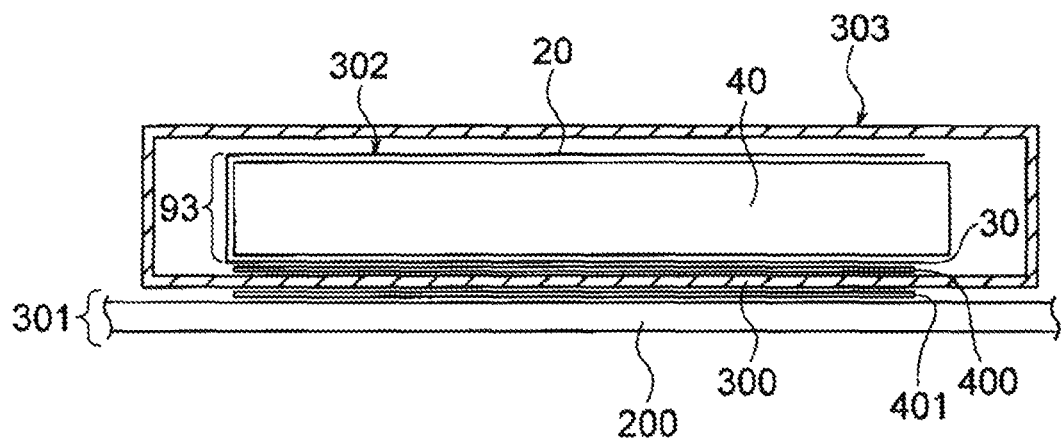
FIG. 8B is a vertical cross-sectional view of an RF tag according to a second modification of the third embodiment

As shown in FIG. 8B, an adhesive layer 401 formed by an adhesive cured may be provided between the third insulating substrate 300 (case 303) and the conductor 200 so that the adhesive layer 401 firmly fixes the third insulating substrate 300 (case 303) and the conductor 200 to each other.

Figure 9:
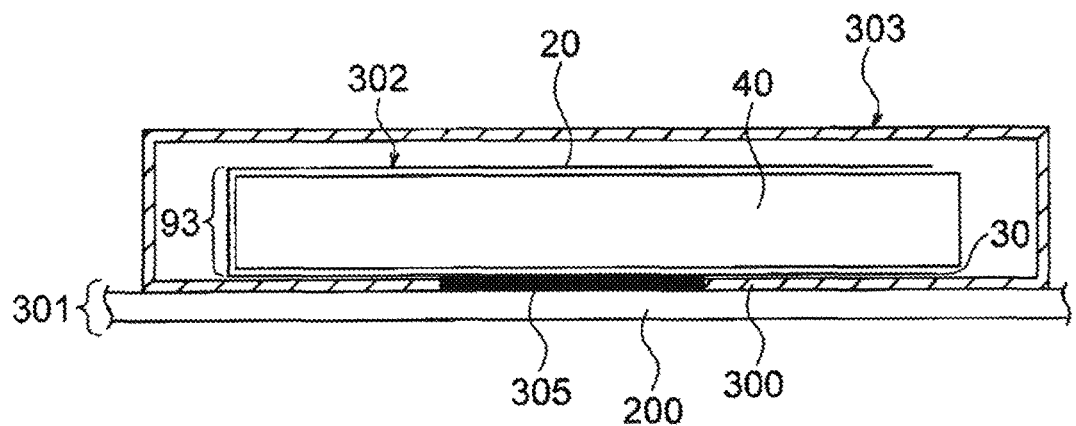
FIG. 9 is a vertical cross-sectional view of an RF tag according to a third modification of the third embodiment

As shown in FIG. 9, a connecting conductor 305 may be fitted in the case 303, and the connecting conductor 305 may electrically connect the second waveguide device 30 and the conductor 200 to each other. In this embodiment, the connecting conductor 305 is fitted in a lower surface (surface facing the conductor 200) of the case 303. Thus, the second waveguide device 20, the connecting conductor 305 and the conductor 200 function as one large waveguide device. In this way, the sensitivity of the plate-shaped inverted-F antenna can be improved.

Figure 10:
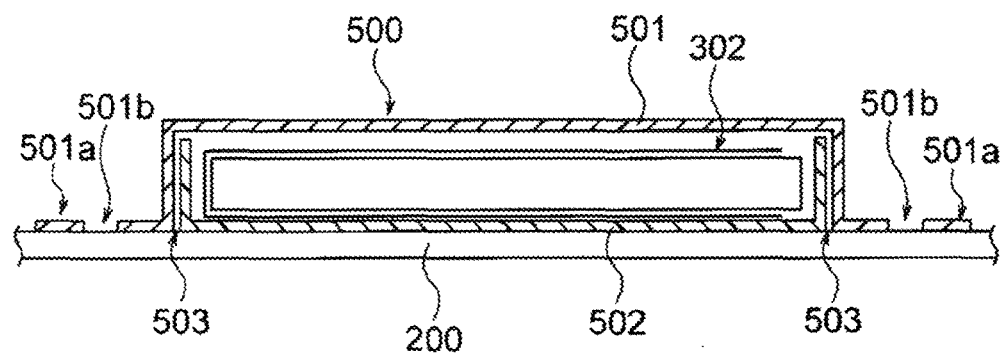
FIG. 10 is a vertical cross-sectional view of an RF tag according to a fourth modification of the third embodiment

The case housing the RF tag is not limited to the case 303 described above. FIG. 10 is a vertical cross-sectional view of a case 500 according to a modification. The case 500 has a housing 501 that is open at the bottom and a lid 502 that is open at the top. The lid 502 with the RF tag 302 housed therein is housed in the housing 501. The housing 501 includes outer peripheral parts 501a that extend from left and right side surfaces thereof, respectively. A hole 501b is formed in the outer peripheral part 501a. The holes 501b can be used to fix the case 500 to the conductor 200 with fixing means, such as a bolt and a nut.

As described above, the case 500 has the lid 502 that houses the RF tag 302 and the housing 501 that houses the lid 502 and is fixed to the conductor 200 with fixing means through the holes 501b.

Although not shown, the case 500 may be fixed to the conductor 200 by the adhesive layer 401 described above. Alternatively, a gap 503 between the inner side surface of the housing 501 and the outer side surface of the lid 502 may be filled with an adhesive. In this way, waterproofness and dustproofness of the case 500 can be improved.

Fourth Embodiment

Next, an RF tag antenna and an RF tag according to a fourth embodiment will be described. Note that the same components as those in the first to third embodiments are denoted by the same reference numerals, and descriptions thereof will be omitted. The structure according to this embodiment is the structure shown in FIGS. 8A and 8B that is additionally provided with a biasing member 601 in a gap 600 between the RF tag 302 and the case 303.

Figure 11A:
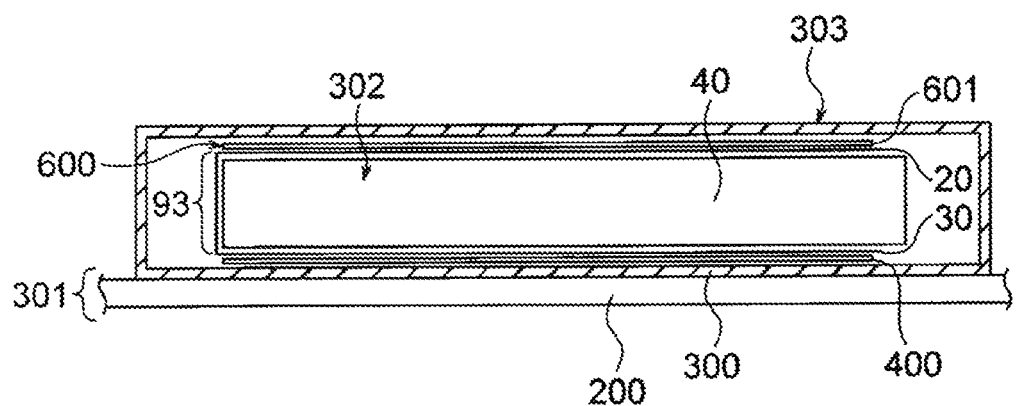
FIG. 11A is a vertical cross-sectional view of an RF tag according to a fourth embodiment.
Figure 11B:
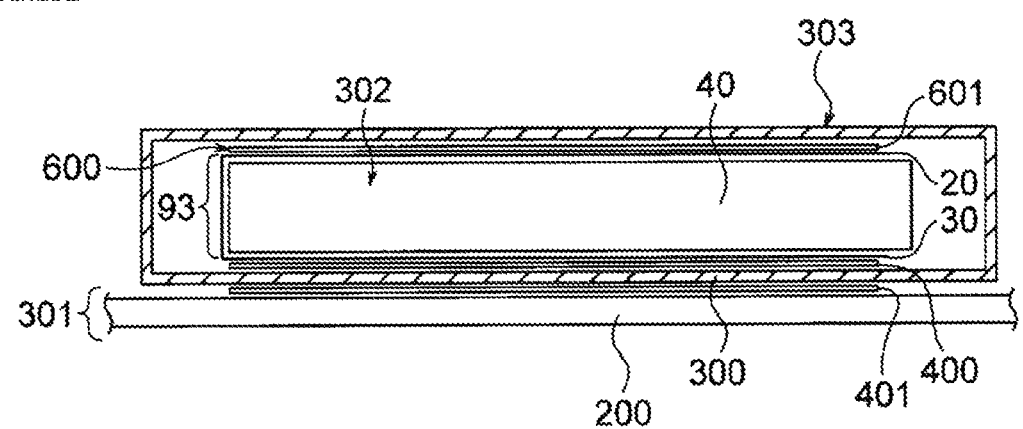
FIG. 11B is a vertical cross-sectional view of an RF tag according to a modification of the fourth embodiment.
Figure 12A:
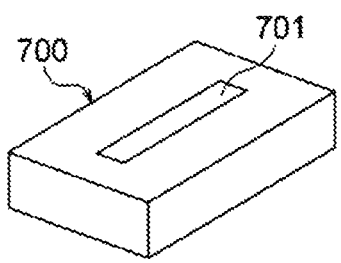
FIG. 12A is a perspective view of a case according to a first example of a fifth embodiment.
Figure 12B:
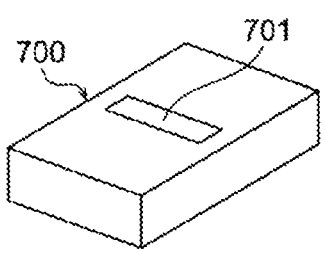
FIG. 12B is a perspective view of a case according to a second example of the fifth embodiment.
Figure 12C:
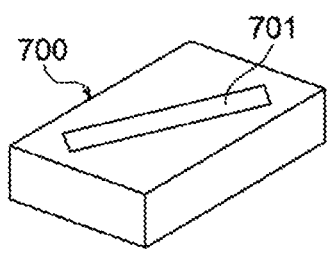
FIG. 12C is a perspective view of a case according to a third example of the fifth embodiment.
Figure 12D:
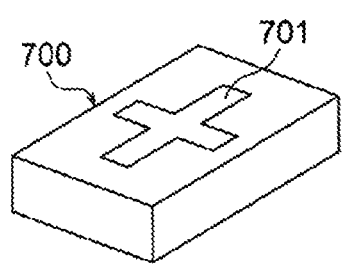
FIG. 12D is a perspective view of a case according to a fourth example of the fifth embodiment.
Figure 12E:
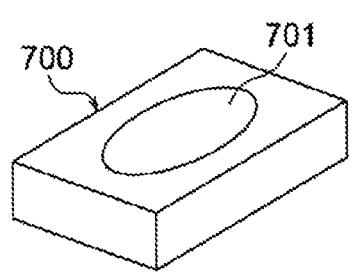
FIG. 12E is a perspective view of a case according to a fifth example of the fifth embodiment.

As shown in FIGS. 11A and 11B, in the gap 600 between the RF tag 302 and the upper inner surface (first inner surface) of the case 303, the biasing member 601, which pushes the RF tag 302 toward the lower inner surface (second inner surface) that is opposite to the upper inner surface, is provided. In this way, the antenna sensitivity can be improved. Furthermore, when a vibration is applied to the case 303, the RF tag 302 can be prevented from rattling in the case 303, and the service life of the RF tag 302 can be extended. The first inner surface may be the lower inner surface of the case 303.

In this embodiment, the biasing member 601 is formed by an adhesive layer filling the gap 600. The adhesive layer is formed by an adhesive cured. The biasing member 601 preferably has a thickness greater than the thickness of the gap 600. In this way, when the RF tag 302 is housed in the case 303, the RF tag 302 is firmly pressed against to the bottom (that is, toward the conductor 200).

The biasing member 601 may not be the adhesive layer but may be a member made of a material having shrink properties, such as urethane, or a spring made of resin, for example.

A protrusion (rib) may be provided on the upper inner surface of the case 303 to push the RF tag 302 toward the lower inner surface. That is, a protrusion that pushes the RF tag 302 toward the second inner surface may be provided on the first inner surface of the case 303. The first inner surface may be the lower inner surface of the case 303.

Fifth Embodiment

Next, an RF tag antenna and an RF tag according to a fifth embodiment will be described. In this embodiment, a case 700 that houses the RF tag is made of a conductive material, such as metal, and an opening through which the radio wave passes is formed in the case 700.

As shown in FIGS. 12A to 12E, an opening 701 through which the radio wave from the reader passes is formed in the case 700 made of a conductive material. The opening 701 is formed in the upper surface of the case 700. The radio wave having passed through the opening 701 is received by the RF tag antenna housed in the case 700.

As with the case 303 shown in FIG. 9, the case 700 is fixed in such a manner that the lower surface thereof is in contact with the conductor (not shown), and the second waveguide device 30 and the conductor are electrically connected to each other via the lower surface of the case 700. The second waveguide device 30, the case 700 and the conductor function as one large waveguide device. Thus, the sensitivity of the plate-shaped inverted-F antenna can be improved.

The shape of the opening 701 is preferably modified depending on the characteristics of the radio wave. For example, the shape of the opening 701 may be appropriately modified to be a single straight line shown in FIGS. 12A to 12C, crossing two straight lines shown in FIG. 12D, or an ellipse shown in FIG. 12E.

The shape of the opening 701 is not limited to the rectangular shape, the cross shape or the circular shape but may be other shapes, such as an elliptic shape or a star shape.

The area of the opening 701 is preferably about 10% of the area of the surface (the upper surface and the forward, backward, left and right side surfaces) of the case. However, the area of the opening 701 can be adjusted depending on the type of the radio wave or the location where the case is placed.

Although some embodiments of the present invention have been described, these embodiments are given only for illustrative purposes and not intended to limit the scope of the present invention. Various modifications to these embodiments are possible, and various omissions, replacements or changes can be made without departing from the spirit of the present invention. These embodiments and modifications thereto are included in the scope and spirit of the present invention and included in the scope of the invention described in the claims and equivalents thereof.

REFERENCE SIGNS LIST

1 Substrate
3 Mount
3a Passage hole
3b Suction air hole
4 Guide part
5 Pushing member
6 Positioning member
7 Air pipe
8 Rubber roller
9 Biasing member 10 RF tag antenna
11 RF tag antenna
20 First waveguide device
30 Second waveguide device
40 First insulating substrate
50 Power feeding part
60 Short-circuit part
70, 70A Sheet
80 IC chip
90 Extension part
91 Second insulating substrate
92 Capacitor
93 Capacitor (first capacitor)
100, 100A RF tag
150 Target object
200 Conductor
201 Placement surface
202 Non-placement surface
300 Third insulating substrate
301 Capacitor (second capacitor)
302 RF tag
303 Case
305 Conductor of case
400 Adhesive layer
401 Adhesive layer
500 Case
501 Housing
501a Outer peripheral part
501b Hole
502 Lid
503 Gap
600 Gap
601 Biasing member
700 Case
701 Opening
H Direction
L Inductor pattern

What is claimed:

1. An RF tag antenna, comprising:
a first insulating substrate having a first principal surface and a second principal surface that is opposite to the first principal surface;
a first waveguide device provided on the first principal surface;
a second waveguide device provided on the second principal surface;
a power feeding part that is provided on a side surface of the first insulating substrate and electrically connected to the second waveguide device at one end thereof; and
a short-circuit part that is provided on the side surface of the first insulating substrate and electrically connected to the first waveguide device at one end thereof and to the second waveguide device at another end thereof,
wherein the first insulating substrate, the first waveguide device, the second waveguide device, the power feeding part and the short-circuit part form a plate-shaped inverted-F antenna that receives a radio wave transmitted from a reader,
an inductor pattern formed by the first waveguide device, the short-circuit part, the second waveguide device and the power feeding part and a capacitor formed by the first waveguide device, the second waveguide device and the first insulating substrate form a resonant circuit that resonates in a frequency band of the radio wave,
the first insulating substrate is formed of a dielectric material having a shape of a rectangular parallelepiped that has a long side, a short side and a height,
the power feeding part and the short-circuit part are each provided on a side surface of the first insulating substrate on the short side, and
an IC chip mounting part on which an IC chip is mounted is provided on the first principal surface of the first insulating substrate on the short side, between the power feeding part and the first waveguide device.

2. The RF tag antenna according to claim 1, wherein the first waveguide device provided on the first principal surface of the first insulating substrate is formed in a rectangular shape along the shape of the first principal surface of the first insulating substrate,
the second waveguide device provided on the second principal surface of the first insulating substrate is formed in a rectangular shape along the shape of the second principal surface of the first insulating substrate,
a recess is formed at an end of the first waveguide device on the short side, and the IC chip mounting part is formed on the recess.

3. The RF tag antenna according to claim 1, wherein the power feeding part and the short-circuit part each have rectangular shapes, and are provided on the side surface of the first insulating substrate on the short side in parallel with each other.

4. The RF tag antenna according to claim 1, wherein a material of the first insulating substrate is foamed styrol.

5. The RF tag antenna according to claim 1, wherein a relative dielectric constant of the dielectric material is 1 to 5 inclusive.

6. An RF tag, comprising:
the RF tag antenna according to claim 1; and
an IC chip that operates based on a radio wave, wherein the resonant
circuit has a resonance
frequency that is set by considering an inductance of the inductor pattern, a capacitance of the capacitor and an equivalent capacitance in the IC chip.

7. An RF tag with a case, comprising: the RF tag according to claim 6 and an insulating case housing the RF tag.

8. The RF tag with the case according to claim 7, wherein a biasing member is provided between the case and the RF tag.

* * * * *